(12) United States Patent
Friedrich

(10) Patent No.: US 10,858,560 B2
(45) Date of Patent: Dec. 8, 2020

(54) METHOD FOR OPERATING A REFRIGERATION SYSTEM AND ASSEMBLY OF A REFRIGERATION SYSTEM

(71) Applicant: Bayerische Motoren Werke Aktiengesellschaft, Munich (DE)

(72) Inventor: Thomas Friedrich, Woerthsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 75 days.

(21) Appl. No.: 15/953,215

(22) Filed: Apr. 13, 2018

(65) Prior Publication Data

US 2018/0230349 A1 Aug. 16, 2018

Related U.S. Application Data

(63) Continuation of application No. PCT/EP2016/073774, filed on Oct. 5, 2016.

(30) Foreign Application Priority Data

Oct. 14, 2015 (DE) .................. 10 2015 219 869

(51) Int. Cl.
*C09K 5/04* (2006.01)
*F25B 1/00* (2006.01)
*B60H 1/32* (2006.01)

(52) U.S. Cl.
CPC .......... *C09K 5/042* (2013.01); *B60H 1/32011* (2019.05); *C09K 5/041* (2013.01);
(Continued)

(58) Field of Classification Search
CPC ..... B60H 1/32011; B60H 1/3227; F25B 1/00; F25B 2400/08
See application file for complete search history.

(56) References Cited

U.S. PATENT DOCUMENTS 6,122,930 A 9/2000 Nishiguchi et al.
6,266,975 B1 * 7/2001 Assaf .................... F24F 3/1411
62/271
(Continued)

FOREIGN PATENT DOCUMENTS

CN 104633992 A 5/2015
CN 105723166 A 6/2016
(Continued)

OTHER PUBLICATIONS

Chinese Office Action issued in Chinese counterpart application No. 201680041993.4 dated Jul. 3, 2019, with English translation (Sixteen (16) pages).
(Continued)

*Primary Examiner* — Elizabeth J Martin
(74) *Attorney, Agent, or Firm* — Crowell & Moring LLP

(57) ABSTRACT

An assembly of a refrigeration system of a motor vehicle includes a refrigerant with a first component and a second component, a condenser; and an evaporator. The evaporator is connected downstream fluidically of the condenser by a first line and has an outlet and a separating location which is coupled fluidically by a second line to a storage vessel for the second component of the refrigerant. The outlet is disposed on a first side of the evaporator and the separating location is disposed on a second side of the evaporator. Refrigerant which is not evaporated during operation of the refrigeration system collects in the separating location.

12 Claims, 2 Drawing Sheets

(52) U.S. Cl.
CPC .......... *F25B 1/00* (2013.01); *C09K 2205/102* (2013.01); *F25B 2400/08* (2013.01)

(56) References Cited

U.S. PATENT DOCUMENTS

| | | | |
|---|---|---|---|
| 6,336,333 B1 * | 1/2002 | Lindgren ............... | C09K 5/042 252/67 |
| 2004/0103677 A1 * | 6/2004 | Hirota ................... | F25B 41/043 62/197 |
| 2016/0187014 A1 * | 6/2016 | Becker ..................... | F25B 7/00 62/99 |

FOREIGN PATENT DOCUMENTS

| | | |
|---|---|---|
| DE | 10 2008 002 319 A1 | 12/2009 |
| DE | 10 2011 077 079 A1 | 12/2012 |
| DE | 10 2013 017 396 A1 | 4/2015 |
| WO | WO 2015/048858 A1 | 4/2015 |

OTHER PUBLICATIONS

PCT/EP2016/073744, International Search Report dated Dec. 23, 2016 (Two (2) pages).

German Search Report issued in German counterpart application No. 10 2015 219 869.3 dated Jun. 21, 2016, with Statement of Relevancy (Six (6) pages).

\* cited by examiner

METHOD FOR OPERATING A REFRIGERATION SYSTEM AND ASSEMBLY OF A REFRIGERATION SYSTEM

CROSS REFERENCE TO RELATED APPLICATIONS

This application is a continuation of PCT International Application No. PCT/EP2016/073774, filed Oct. 5, 2016, which claims priority under 35 U.S.C. § 119 from German Patent Application No. 10 2015 219 869.3, filed Oct. 14, 2015, the entire disclosures of which are herein expressly incorporated by reference.

BACKGROUND AND SUMMARY OF THE INVENTION

The invention relates to a method for operating a refrigeration system of a motor vehicle, which refrigeration system has a refrigerant, and to an assembly of a refrigeration system of a motor vehicle. The refrigeration system is, in particular, an air conditioning system or serves to cool energy cells of the motor vehicle.

Motor vehicles usually have an air conditioning system. An interior space of the motor vehicle is temperature controlled by means of the air conditioning system. In the case of a comparatively high external temperature, air is first of all cooled by means of the air conditioning system and, in a further operating step, the cooled air is guided into the interior space. The air conditioning, system is used even in the case of a low external temperature, an air humidity of the air which is guided into the interior space being reduced by means of the air conditioning system in this ease. The air conditioning system is configured in the manner of a refrigeration system.

A further application of refrigeration systems of this type is the cooling of what is known as a high voltage battery of the motor vehicle, by means of which energization of an electric motor of the motor vehicle takes place. Here, the motor vehicle is driven either merely by means of the electric motor, or what is known as a hybrid system is used for the drive, in which hybrid system an internal combustion engine is provided in addition to the electric motor. In the case of braking of the motor vehicle, the electric motor is operated as a generator by means of suitable actuation, with the result that the kinetic energy of the motor vehicle is converted into electric energy which is provided for driving the motor vehicle at a later time. The high voltage battery is heated, in particular, during charging and at high speeds, which, at an excessive can lead to damage of the high voltage battery and even to thermal malfunction.

The refrigeration system usually has an evaporator, a condenser and a compressor. They are connected to one another by means of lines, within which a refrigerant is situated. During operation, the volume of the refrigerant which is present as a gas/liquid mixture is increased by means of the evaporator, which leads to a pressure drop of the refrigerant. The temperature of the refrigerant drops during an expansion and, as a consequence, a pressure drop. Here, the refrigerant is evaporated either completely or at least partially. The cooled refrigerant is brought into thermal contact with a component, for example by means of a heat exchanger. As a consequence, thermal energy is removed from the component and the refrigerant is heated. The refrigerant which is enriched with thermal energy in this way is first of all guided to the compressor, and is compressed there again to the increased pressure, which leads to further heating of the refrigerant. The refrigerant is subsequently fed to the condenser, where the thermal energy of the refrigerant is dissipated to the surrounding area of the condenser. The condenser is usually in thermal contact with the surrounding area of the motor vehicle, with the result that the thermal energy is conducted into the surrounding area of the motor vehicle. Subsequently, the refrigerant is fed to the evaporator again.

The refrigerant which is used has to have a boiling point which is comparatively low, even in the case of a comparatively low pressure drop, with the result that the components of the refrigeration system which are used can be manufactured in a comparatively inexpensive manner. A further requirement of the refrigerant is that the refrigerant does not freeze, even at negative temperatures which occur, for example, during winter, which would otherwise lead to damage of the refrigeration system. As a consequence, for example, ammonia or CFCs are used, which leads to damage of the environment if released. Disposal of a refrigeration system of this type is therefore comparatively complicated. In order to avoid an escape of the refrigerant even in the case of an accident, a comparatively great structural complexity is required.

The invention is based on the object of specifying a particularly suitable method for operating a refrigeration system of a motor vehicle and a particularly suitable assembly of a refrigeration system of a motor vehicle, an environmental impact and/or a degree of efficiency being improved, in particular.

The method serves to operate a refrigeration system of a motor vehicle. The refrigeration system is, for example, an air conditioning system, by means of which temperature control of an interior space of the motor vehicle takes place during operation. In an alternative to this, the refrigeration system serves to cool an energy store of the motor vehicle, in particular what is known as a high voltage battery. The high voltage battery expediently comprises a number of individual energy cells which are connected electrically to one another. The high voltage battery expediently has an electric voltage between 300 V and 800 V and, in particular, equal to 400 V. Energization of an electric motor of the motor vehicle expediently takes place by means of the energy store, which electric motor serves to drive the motor vehicle. Here, for example, the motor vehicle has merely the electric motor. As an alternative to this, the motor vehicle includes an internal combustion engine. In other words, the motor vehicle is what is known as a hybrid motor vehicle.

The refrigeration system has a refrigerant with a first component and with a second component which differ with regard to their material properties. In other words, the first component is formed from a first material and the second component is formed from a second material. Here, in particular, the chemical composition of the two components differs. In other words, different components are not understood to mean, in particular, that they are identical materials but in a different physical state. In particular, the refrigerant consists of the two components. In other words, the refrigerant does not have any further chemical products. During operation, for example, one of the two components is present merely in a gaseous physical state and the remaining component is present either in the liquid state or in the gaseous state. One of the two components particularly preferably always remains in a liquid physical state during operation. As an alternative, the physical state of the two components is changed during operation of the refrigeration system. In this way, the degree of efficiency of the refrigeration system is increased.

During operation, a parameter is determined which is, in particular, an external parameter. In other words, the parameter does not represent a state of the refrigeration system itself, but rather is determined by means of another method. In particular, the parameter describes a state of the motor vehicle or else the state of the surrounding area of the motor vehicle. A ratio between the first component and the second component is adapted in a manner which is dependent on the parameter. In other words, a setting operation is carried out as to how many times the proportion of the first component in the refrigerant is greater than or smaller than the proportion of the second component. If the refrigerant consists of the two components, a setting operation is carried out as to which proportion of the refrigerant the first component has and which proportion of the refrigerant the second component has.

The setting is checked, for example, with the result that a closed loop control takes place. As an alternative to this, no checking takes place. In other words, the ratio is open loop controlled. In particular, the ratio is adapted continuously in case of a change of the parameter. As an alternative to this, the possible value region of the parameter is divided into subregions, and each subregion is assigned a defined ratio, with the result that setting takes place in steps. The setting takes place, in particular, after the manufacture of the refrigeration system and, in particular, after manufacture of the motor vehicle. In this way, an adaptation of the refrigeration system to different requirements and conditions is made possible, without this having to be taken into consideration during the manufacture of the refrigeration system or the motor vehicle. In particular, the refrigeration system is not dismantled, not even partially, for adaptation to the parameter.

On account of the two components, the refrigerant has certain physical properties which are changed in a manner which is dependent on the ratio of the two components to one another. For instance, the boiling or the freezing point of the refrigerant can be set, in particular, by means of setting of the ratio of the two components to one another. On account of the change of the ratio of the two components to one another, the two points are shifted during operation in a manner which is dependent on the parameter, with the result that a flexibility of the refrigeration system and therefore a field of application of the refrigeration system are increased. As a result, replacement of the complete refrigerant is not required for adaptation of the refrigeration system, which reduces an environmental impact. In addition, components can be used which are provided specifically for the envisaged fields of application, operation of the refrigeration system also continuing to be ensured on the basis of the change of the ratio in the case of a change of the envisaged area of application. As a consequence, the degree of efficiency in the main area of application is improved.

For example, an external temperature of the motor vehicle is selected as parameter. In this way, setting of the refrigeration system to the surrounding area of the motor vehicle is made possible, it always being possible for a comparatively great degree of efficiency or else at least appropriate functioning of the refrigeration system to be ensured. Thus, for example, the ratio of the two components is changed if the external temperature undershoots a defined temperature value, for example 5° C., 3° C., 0° C. or −3° C. As an alternative or in combination with this, the ratio is changed if the external temperature exceeds 20° C., 25° C., 30° C. 35° C. or 40° C. As an alternative or in combination with this, a temperature of an evaporator of the refrigeration system is selected as parameter. In other words, the temperature of the evaporator of the refrigeration system is first of all determined and is used as a parameter, and the ratio of the two components to one another is changed in a manner which is dependent on the parameter. If the temperature of the evaporator undershoots or exceeds a defined value, at which appropriate functioning of the evaporator cannot be ensured, the ratio of the two components is changed and, as a consequence, the physical properties of the refrigerant are adapted. Here, the ratio is set in such a way that appropriate operation of the refrigeration system is made possible even at the determined temperature of the evaporator.

The second component preferably has a lower freezing point than the first component. In other words, a first component is used with a freezing point which is higher than the freezing point of the second component. As a consequence, the freezing point of the refrigerant is lowered by means of the second component, with the result that operation of the refrigeration system is made possible even at comparatively low external temperatures, without the refrigerant changing into a solid physical state, that is to say freezing. In particular, operation of the motor vehicle is made possible in this way in winter even after a comparatively long standstill time. In particular, the proportion of the second component is increased at a comparatively low temperature, with the result that freezing of the refrigerant is ruled out. At a comparatively high temperature, in contrast, the proportion of the second component is reduced, which increases a degree of efficiency of the refrigeration system.

For example, water which has comparatively satisfactory thermodynamic properties is used as first component. As a consequence, the degree of efficiency of the refrigeration system is comparatively high. As an alternative or particularly preferably in combination with this, glycol or ethanol which have a comparatively low freezing point are used as second component. Therefore, in the case of a suitable selection of the ratio of the first component to the second component, the refrigerant has a comparatively low freezing point, for which reason operation of the refrigeration system in a comparatively cold surrounding area is also made possible. In particular, water is used as first component and glycol or ethanol is used as second component. In this way, comparatively severe environmental damage is ruled out even in the case of any leak of the refrigeration system. In addition, these are comparatively inexpensive materials, which reduces manufacturing costs. Refilling of materials of this type is also comparatively non-hazardous, with the result that this can even take place by way of untrained staff or by way of the user of the motor vehicle himself/herself, which reduces maintenance costs.

The assembly of a refrigeration system is a constituent part of a motor vehicle. The refrigeration system consists, for example, of the assembly or has, in particular, further constituent parts, such as a heat exchanger, in particular. The refrigeration system itself is, for example, an air conditioning system and serves to control the temperature of an interior space of the motor vehicle, within which persons are situated. In an alternative to this, an energy store of the motor vehicle is cooled during operation by means of the refrigeration system, for which purpose at least one constituent part of the refrigeration system is in thermal contact with the energy store. The energy store is, for example, a high voltage battery and has an electric voltage between 200 V and 1000 V, in particular between 300 V and 800 V. For example, the high voltage battery has an electric voltage of 400 V. The energy store serves, for example, to energize an electric motor of the motor vehicle, by means of which electric motor the motor vehicle is driven. In particular, the motor vehicle has merely the electric motor or a number of electric motors as drive. As an alternative to this, the motor vehicle additionally includes an internal combustion engine and, as a consequence, is configured as what is known as a hybrid vehicle.

The assembly has a condenser and an evaporator which is connected fluidically downstream, which are connected to one another by means of a first line. During operation of the refrigeration system, a refrigerant is guided from the condenser through the first line to the evaporator, with the result that the flow direction is directed from the condenser to the evaporator. For this purpose, the first line is coupled fluidically, in particular, to an outlet of the condenser and to an inlet of the evaporator. Here, the refrigerant is evaporated at least partially during operation by means of the evaporator, which takes place by means of a pressure decrease of the refrigerant. For this purpose, the evaporator suitably has an injection nozzle. The refrigerant is condensed by means of the condenser, with the result that the refrigerant is changed at least temporarily from a gaseous state into a liquid state. In particular, a heat sink is in thermal contact with the condenser, for example with an outer wall of the condenser. As an alternative or particularly preferably in combination with this, a heat source is in thermal contact with the evaporator, in particular with an outer wall of the evaporator. For example, the energy store, insofar as it is present, is coupled thermally to the evaporator, and/or the condenser is loaded with ambient air of the motor vehicle. As a consequence, thermal energy is removed during operation of the refrigeration system from the component which is coupled thermally to the evaporator. Thermal energy is dissipated by means of the condenser, for example into a surrounding area of the motor vehicle.

The evaporator has a separating location, at which, in particular, refrigerant which is not evaporated during operation collects during operation. In particular, the separating location is provided and set up, and/or configured, for example, in such a way that refrigerant which is not evaporated during operation collects there during operation. In particular, the separating location is formed by means of the bottom of the evaporator or comprises at least the bottom. For example, the bottom is of funnel-shaped configuration. The separating location is coupled fluidically by means of a second line to a storage vessel, within which a second component of the refrigerant is situated at least partially during operation. As a consequence, during operation of the assembly, the second component of the refrigerant is separated at least partially by means of the evaporator and is conducted by means of the second line to the storage vessel, with the result that it is removed from the refrigeration circuit of the refrigeration system. As a consequence, the proportion of the second component in the refrigerant is reduced. Therefore, that proportion of the second component which is not to be evaporated under the current conditions is removed from the refrigerant, which improves the degree of efficiency of the refrigeration system. The second component which is situated in the storage vessel is not a constituent part of the refrigerant and, in particular, is not a constituent part of any refrigeration circuit of the refrigeration system.

In particular, the refrigerant has a first component and expediently consists of the first and the second component. In particular, the storage vessel is of pressure-tight configuration and is expediently produced from a plastic. For example, the storage vessel has a filler neck, by means of which the second component, or else, in particular, the first component, can be introduced into the storage vessel, for example manually. In particular, the filler neck is of pressure-tight configuration. In other words, this is a filler neck which can be closed in a pressure-tight manner.

The storage vessel is expediently coupled fluidically by means of a third line to the condenser. Here, the third line has a first metering apparatus, for example a pump, in particular a metering pump or micropump, or a shut-off valve. During operation, a flow of the second component from the storage vessel to the condenser is open loop controlled or closed loop controlled by means of the first metering apparatus. Here, the condenser expediently serves as a mixing vessel, with the result that the second component is mixed with further components within the condenser. As a consequence, a proportion of the second component which is situated in the storage vessel is fed to the coolant by means of the condenser and the first metering apparatus, and therefore the concentration of the second component is increased within the refrigerant. Since condensing of the refrigerant takes place by means of the condenser and the second component is expediently likewise fed to the condenser in liquid form, mixing is comparatively efficient, for which reason the refrigerant which is fed to the condenser has a comparatively great homogeneity.

The condenser is expediently of pressure-tight configuration and has, for example, a filler neck which is likewise of pressure-tight configuration. In other words, the condenser has a filler neck which can be closed in a pressure-tight manner. The filler neck makes it possible to refill refrigerant into the condenser, or at least to refill constituent parts of the refrigerant, such as the second component or the first component. Mixing of the individual components is therefore made possible by means of the condenser. In other words, the condenser serves, inter alfa, to mix the refrigerant.

The first metering apparatus is loaded in terms of signal technology, in particular, with a value of an external parameter. In other words, the first metering apparatus is actuated in a manner which is dependent on the external parameter. The external parameter is, for example, the external temperature of the motor vehicle, with the result that the concentration of the second component within the refrigerant is changed in a manner which is dependent on the external temperature of the motor vehicle. In particular, the concentration of the second component is increased at a comparatively low temperature. As an alternative or in combination with this, the first metering apparatus is actuated in a manner which is dependent on a temperature of the evaporator or a filling level of the storage vessel. In particular, the first metering apparatus is actuated at a comparatively low temperature of the evaporator or an increased filling level within the storage vessel, in such a way that that proportion of the second component which is situated in the storage vessel is introduced at least partially into the condenser.

In particular, the first metering apparatus is coupled in terms of signal technology to a control unit, by means of which operating data are evaluated, such as the external parameter, the temperature of the evaporator and/or the filling level of the storage vessel. In particular, the passage of fluids through the third line is made possible merely from the storage vessel to the condenser on account of the first metering apparatus. In other words, merely a flow of the second component from the storage vessel to the condenser is possible.

The storage vessel expediently has an overflow which is coupled fluidically to the condenser by means of a fourth line. If the filling level within the storage vessel exceeds a defined value, the second component is fed to the condenser by means of the fourth line. As a consequence, the second component is always fed at least to a comparatively small extent to the condenser on account of the overflow, if the refrigeration system is filled with a sufficient quantity of the second component. In this way, the second component is always moved even in the case of a non-actuated first apparatus, insofar as it is present, for which reason depositing, separating or dehomogenizing of the second component on account of deficient mixing is ruled out. If the second component is not required, for example on account of a comparatively high temperature, it is conducted out of the evaporator to the storage vessel by means of the second line, without it evaporating. As a consequence, the second component does not accumulate in the evaporator, and the degree of efficiency of the refrigeration system is not reduced on account of the second component which is fed in by means of the overflow. In particular, the refrigeration system has a greater quantity of second component than the storage vessel holds.

The first line preferably has a second metering apparatus. The second metering apparatus expediently ensures that a passage of the refrigerant is made possible merely from the condenser to the evaporator. In other words, the second metering apparatus acts in the manner of a check valve. In particular, the second metering apparatus is shut-off valve or a pump, such as a metering pump or micropump. In particular, the second metering apparatus is loaded in a manner which is dependent on a filling level of the condenser or of the evaporator. The second metering apparatus is particularly preferably loaded in a manner which is dependent on a performance requirement of the refrigeration system. In other words, the cooling performance of the refrigeration system is set using the second metering apparatus. The second metering apparatus is preferably actuated in a manner which is dependent on an external temperature, a temperature of the evaporator or a temperature of a component of the motor vehicle to be cooled, and/or the delivery capacity of the second metering apparatus is set if it is configured as a pump.

As an alternative or in combination with this, the second line has a third metering apparatus. In particular, a passage of the second component from the storage vessel to the evaporator is prevented by means of the second metering apparatus. In particular, the second metering apparatus is configured in the manner of a check valve. The third metering apparatus is, for example, a shut-off valve or a pump, such as a metering pump or a micropump. During operation, in particular, that proportion of the second component which is situated at the separating location of the evaporator is transported to the storage vessel by means of the second metering apparatus. As a consequence, an arrangement of the storage vessel independently of the evaporator is made possible, since even any height differences can be compensated for by means of the third metering apparatus. In particular, the third metering apparatus is actuated in a manner which is dependent on a performance requirement of the refrigeration system, an external temperature of the motor vehicle, a temperature of the condenser or of the evaporator, or a filling level of the storage vessel or of the evaporator.

The assembly expediently includes a fifth line, by means of which an outlet of the evaporator is connected fluidically to an inlet of the condenser. In particular, the fifth line has a check valve and/or a pump, it being ensured by means of the latter that merely a transport of the refrigerant from the evaporator to the condenser is made possible through the fifth line. The refrigeration circuit of the refrigeration system is closed by means of the fifth line, for which reason the refrigerant is reused. In particular, thermal energy is absorbed by means of the refrigerant, for example is dissipated in the region of the evaporator and in the region of the condenser. The fifth line particularly preferably has a compressor, by means of which the refrigerant is compressed. In other words, the pressure of the refrigerant is increased by means of the compressor. Here, the pressure of the refrigerant is preferably increased by means of the compressor to that pressure which the refrigerant has when it is conducted to the inlet of the evaporator.

For example, the fifth line has a heat accumulator. In particular, the heat accumulator is of pressure-tight configuration. For example, the heat accumulator is a pressure accumulator, that is to say is configured in the manner of a steam accumulator. As an alternative to this, the heat accumulator has chemical reactants which react in a manner which is dependent on the heat which is fed in. In the case of an opposite reaction, the stored heat is released again. In a further alternative, the heat accumulator has a sorbent. In other words, the heat accumulator is a sorption heat accumulator. In particular, waste heat of a combustion engine of the motor vehicle is stored by means of the heat accumulator if this is required. In this way, a degree of efficiency of the motor vehicle is increased.

The respective lines, insofar as they are present in each case, are produced, for example, in each case by means of a hose which is produced, for example, from rubber or a plastic. As an alternative or in combination with this, the lines are manufactured either completely and/or in sections from a metal, such as from an aluminum, that is to say from pure aluminum or an aluminum alloy.

The refrigerant expediently has a first component and preferably consists of the first component and the second component. The first component is expediently water and the second component is, in particular, glycol or ethanol. In this way, freezing of the refrigerant at comparatively low temperatures is prevented by means of the second component. In particular, the assembly is operated in accordance with the above method. In other words, the ratio between the first component of the refrigerant and the second component of the refrigerant is set in a manner which is dependent on a parameter. For this purpose, in particular, the first metering apparatus, the second metering apparatus and/or third metering apparatus, insofar as they are present, are/is operated in a suitable manner.

Furthermore, the invention relates to a refrigeration system having an assembly of this type, and to a motor vehicle having an assembly of this type or having a refrigeration system of this type. The refrigeration system consists, for example, of the assembly or has, in particular, further constituent parts, such as a heat exchanger, in particular.

The use of the designations "first, second, third . . . " serves merely for specific designation of the individual components and, in particular, does not imply the presence of a certain number of the components. In other words, the first, second, third, fourth, fifth line are in each case merely a certain line. The first, second and third metering apparatus, insofar as they are present in each case, are likewise in each case merely a certain metering apparatus.

Other objects, advantages and novel features of the present invention will become apparent from the following detailed description of one or more preferred embodiments when considered in conjunction with the accompanying drawings.

In the following text, exemplary embodiments of the invention will be described in greater detail using the drawings.

DETAILED DESCRIPTION OF THE DRAWINGS

Parts which correspond to one another are provided with the same designations in all figures.

Figure 1:
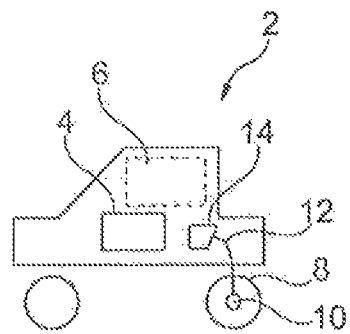
FIG. 1 shows a motor vehicle having a refrigeration system in a diagrammatically simplified manner.

FIG. 1 shows a motor vehicle 2 having a refrigeration system 4 in a diagrammatically simplified manner. The refrigeration system 4 is, for example, an air conditioning system and serves to control the temperature of an interior space 6. In an alternative to this, one of the wheels 8 has a wheel hub motor 10. The wheel hub motor 10 is an electric motor and makes contact by means of a power line 12 with an energy store 14 which has a multiplicity of lithium ion batteries which are connected to one another in a suitable manner for providing an electric voltage of 400 V. Furthermore, the energy store 14 has an inverter (not shown in greater detail), by means of which a direct current which is provided by the energy store 14 is transformed into an alternating current, by means of which the wheel hub motor 10 is operated. The energy store 14 is cooled during operation by means of the refrigeration system 4.

Figure 2:
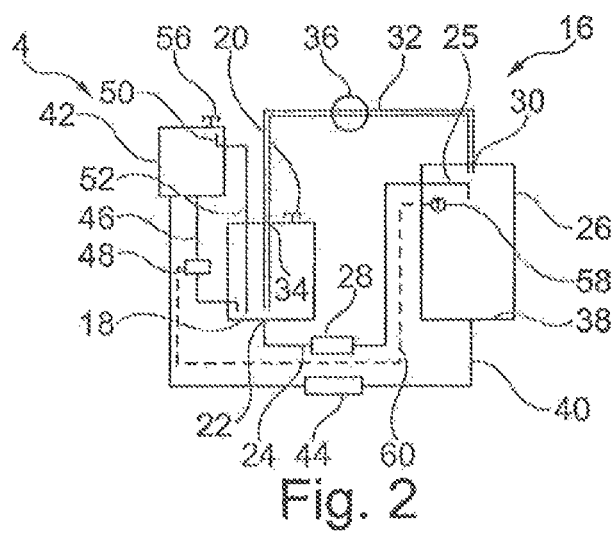
FIG. 2 shows a diagrammatic embodiment of an assembly of the refrigeration system.

FIG. 2 shows an embodiment of an assembly 16 of the refrigeration system 4. For example, the refrigeration system 4 consists of the assembly 16. In an alternative to this, the refrigeration system 4 includes further components (not shown here). The assembly 16 has a condenser 18 which is produced as a pressure-tight vessel from a plastic, for example. During operation, the condenser 18 is loaded with the slipstream, for example, or is water cooled, and is situated, for example, in an engine compartment of the motor vehicle 2. The condenser 18 has a tiller neck 20 for refilling a refrigerant 21 (shown in FIGS. 5 and 6). A first line 24 which comprises, for example, a metal pipe is attached to an outlet 22 of the condenser 18. The remaining end of the first line 24 opens into an injection nozzle 25 of an evaporator 26. The first line 24 has a second metering apparatus 28 in the form of a pump, by means of which that proportion of the refrigerant 21 which is situated within the condenser 18 is pumped to the injection nozzle 25 during operation. The condenser 26 is coupled thermally either to a fan line of the air conditioning system or to the energy store 14.

An outlet 30 of the evaporator 26 opens into a fifth line 32 which is in turn connected in an inlet 34 of the condenser 18. The fifth line 32 has a compressor 36, by means of which it is ensured that the refrigerant 21 can flow merely from the evaporator 26 to the condenser 18 through the fifth line 32. The evaporator 26 has a separating location 38 which is formed by means of the bottom of the evaporator 26. A second line 40 is coupled fluidicaily to the separating location 38 and a storage vessel 42. The second line 40 has a third metering apparatus 44 in the form of a pump, by means of which it is ensured that merely a transport of fluid takes place from the evaporator 26 to the storage vessel 42.

The storage vessel 42 is coupled fluidically to the condenser 18 on one side by means of a third line 46 which has a first metering apparatus 48 in the form of a shut-off valve or a pump. On the other side, the storage vessel 42 has an overflow 50 which is likewise coupled fluidically to the condenser 18 by means of a fourth line 52. As a consequence, the storage vessel 18 is coupled fluidically to the condenser 18 by means of the third line 46 and the fourth line 52, it being possible for a fluid to be conducted by means of the third line 46 from the storage vessel 42 to the condenser 18 merely in the case of an activated first metering apparatus 48. Merely conducting from the storage vessel 42 to the condenser 18 is possible by way of the fourth line 52, in contrast, if the fluid exceeds/has a filling level 54 (shown in FIG. 5). The storage vessel 42 is of pressure-tight configuration and has a filler neck 56 which is likewise of pressure-tight configuration. A fluid can be filled into the storage vessel 42 via the filler neck 56 of the storage vessel 42.

A temperature sensor 58 which is coupled in terms of signal technology by means of a signal line 60 to the first metering apparatus 48 is arranged within the condenser 26. As an alternative, the signal line 60 is routed toward a control unit (not shown), by means of which the first metering apparatus 48, the second metering apparatus 28 and the third metering apparatus 44 are controlled. In particular, the compressor 36 is also controlled by means of the control unit.

Figure 3:
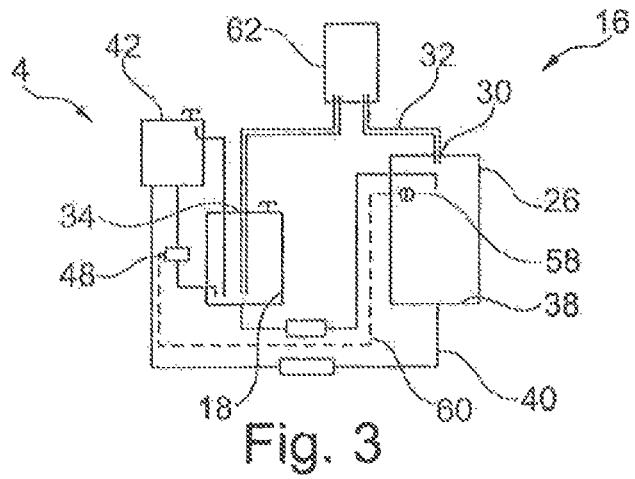
FIG. 3 shows a second embodiment of the assembly in accordance with FIG. 2.

FIG. 3 shows a further embodiment of the assembly 16, which embodiment corresponds to the previous embodiment with the exception of the fifth line 32. The fifth line 32 is once again connected fluidically to the outlet 30 of the evaporator 26 and the inlet 34 of the condenser 18, with the result that a flow of the refrigerant 21 from the evaporator 26 to the condenser 18 is made possible. Furthermore, the fifth line 32 has a heat accumulator 62, by means of which thermal energy is stored. For this purpose, the heat accumulator 62 is configured, for example, in the manner of a steam accumulator or has a sorbent.

During operation of the refrigeration system 4, the refrigerant 21 is situated within the condenser 18, the evaporator 26 and the lines 24, 32, 40, 46, 52. The refrigerant 21 consists of a first component 64 and a second component 66. The first component 64 is water, and either glycol or ethanol is used as second component 66. As a consequence, the first component 64 has a freezing point which is higher than that of the second component 66. In other words, the second component 66 is in the liquid physical state even at temperatures, at which the first component 64 is already present in a solid state. The refrigerant 21 is filled via the filler neck before start-up, the first component 64 and the second component 66 having a defined mixing ratio to one another. The second component 66 is filled into the storage vessel 42 via the filler neck 56 of the storage vessel 42. The quantity of the second component 66 which is situated within the refrigeration system 4 and consists of the part which is situated in the storage vessel 42 and the part which forms the refrigerant 21 is greater than the holding capacity of the storage vessel 42 by between 1% and 5%, preferably 2%.

Figure 4:
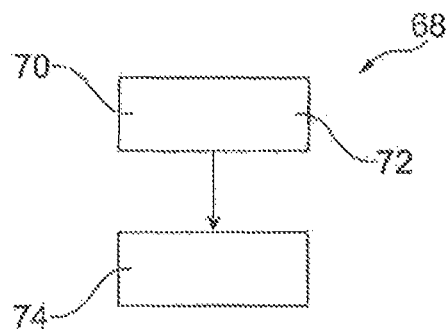
FIG. 4 shows a method for operating the refrigeration system.

FIG. 4 shows a method 68 for operating the refrigeration system 4 in a diagrammatically simplified manner. A parameter 72 is determined in a first operating step 70. The parameter 72 is, for example, the temperature of the evaporator 26, which temperature is detected by means of the temperature sensor 58. As an alternative to this, an external temperature of the motor vehicle 2 is used as a parameter 72, which external temperature is detected in the region of the body of the motor vehicle 2 by way of a temperature sensor (not shown in greater detail). A ratio between the first component 64 of the refrigerant 21 and the second component 66 of the refrigerant 21 is set in a second operating step 74. In other words, the composition of the refrigerant 21 is changed, the proportion of the second component 66 in the refrigerant 21 being increased or decreased.

Figure 5:
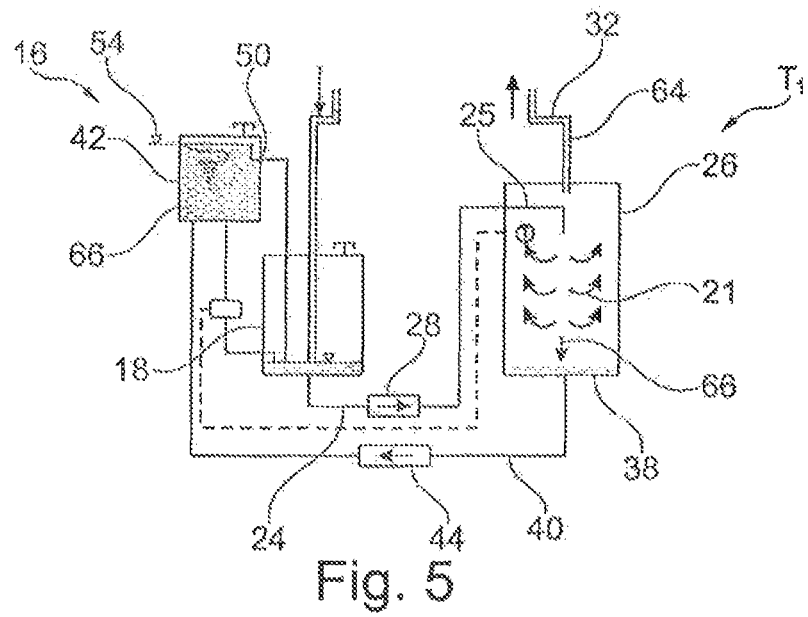
FIG. 5 shows details of the assembly in the presence of a first value of a parameter.
Figure 6:
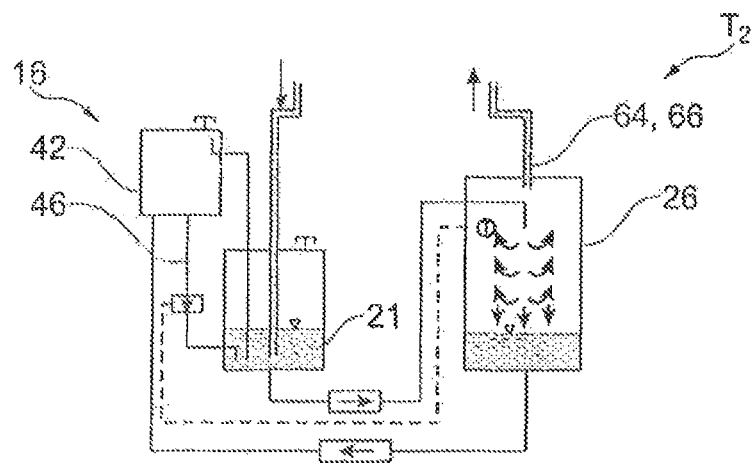
FIG. 6 shows the assembly in accordance with FIG. 5 in the presence of a second value of the parameter.

FIG. 5 shows the assembly 16 at a first temperature T1, and FIG. 6 shows the assembly 16 at a second temperature T2. The two temperatures T1, T2 are the parameter 72, and the first temperature T1 is higher than the second temperature T2. The first temperature T1 is, for example, 20° C., whereas the second temperature T2 is equal to 10° C. At the first temperature T1, the majority of the second component 66 is situated in the storage vessel 42, and merely a comparatively small part of the second component 66 is a constituent part of the refrigerant 21. The refrigerant 21 is present in the liquid state in the condenser 18 and is conveyed by means of the second metering apparatus 28 through the first line 24 to the injection nozzle 25. The pressure of the refrigerant 21 is decreased by means of the evaporator 26/the injection nozzle 25. The pressure decrease is always set in such a way that the majority of the second component 66 is not evaporated, but rather collects at the separating location 38 of the evaporator 26.

In contrast, the evaporated first component 64 is discharged by means of the fifth line 32. The fifth line 32, an outer wall of the evaporator 26 or a further component of the evaporator 26, in particular a heat exchanger, is in thermal contact with a heat exchanger (not shown), depending on the application. The latter is cooled on account of the decreased temperature of the first component 64, whereas the first component 64 is heated, with the result that an exchange of energy takes place. As a consequence, a temperature equalization of the heat exchanger (not shown) and the first component 64 takes place. Merely the first component 64 is preferably conducted in the evaporated form by means of the fifth line 32. It is not ruled out, however, that the refrigerant 21 which is conducted by means of the fifth line 32 has a comparatively small proportion of the second component 66 which is likewise present in evaporated form.

The second component 66 which is situated at the separating location 38 is conveyed by means of the third metering apparatus 44 through the second line 40 into the storage vessel 42. From there, a part of the second component 66, namely that part which exceeds the filling level 54, enters by means of the overflow 50 into the fourth line 52 and is conveyed into the condenser 28. In contrast, the first metering apparatus 48 is not active, for which reason no transport of the second component 66 takes place by means of the third line 46. On account of the overflow 50, the second component 66 remains in motion, for which reason thorough mixing takes place. As a consequence, depositing of any particles or any other change in the second component 66 is prevented. In other words, what is known as dead water is avoided in the storage vessel 42. Furthermore, the first component 64 which is conducted by means of the fifth line 32 and is then compressed again by means of the compressor 36 is introduced into the condenser 18, which first component 64 condenses in the condenser 18. There, the condensed first component 64 and the liquid second component 66 are mixed, for which reason the condenser 18 also serves as a mixing apparatus.

If the temperature drops, the drop in temperature is detected by means of the temperature sensor 58 (as shown in FIG. 6). On account of the drop in temperature, it is not ruled out that the first component 64 changes into the solid physical state and, as a consequence, closes the condenser 18, the first line 24 and the injection nozzle 25. As a consequence, if a drop in temperature is determined, the first metering apparatus 48 is actuated, and the second component 66 is introduced into the condenser 18 where it mixes with the first component 64 in order to form the refrigerant 21. The part which is introduced here is greater than the part which is introduced into the condenser 18 by means of the overflow 50 at the first temperature T1.

On account of the changed ratio of the first component 64 to the second component 66, the freezing point of the refrigerant 21 is lowered, for which reason freezing of the refrigerant 21 on account of the reduced external temperature is avoided. The refrigerant 21 which is provided in this way is in turn fed to the evaporator 26, the evaporator performance being reduced on account of the reduced proportion of the first component 64 in the refrigerant 21 which is fed to the evaporator 26. Since this takes place, however, at a comparatively low second temperature T2, reliable operation of the motor vehicle 2 continues to be possible. That proportion of the second component 66 which collects at the separating location 38 is in turn conducted by means of the second line 40 to the storage vessel 42, and is conducted from there by means of the third line 46 to the condenser 18 again.

If the parameter 72 changes again, that is to say, in particular, the temperature rises to the first temperature T1, the operating mode of the first metering apparatus 48 is changed in turn. The second component 66 collects at the separating location 38 (as shown in FIG. 6). The proportion is conducted by means of the second line 40 to the storage vessel 42, and the operation of the first metering apparatus 48 is ended or reduced. On account of the overflow 50, at least one part of the fluid which collects in the storage vessel 42 is in turn always conducted into the condenser 18, with the result that any part of the first component 64 which is conducted there by means of the second line 40 in any case is fed in turn to the refrigerant 21 within a defined time period.

If, however, the temperature does not rise to the first temperature T1 and is, for example, merely +5° C., the first metering apparatus 48 and the evaporator 26 are operated in such a way that the proportion of the second component 66 in the refrigerant 21 is greater than at the second temperature T2, but is lower than at the first temperature T1. Here, the storage vessel 42 is, for example, half full. Therefore, the evaporator performance, that is to say the cooling performance, is increased in comparison with operation at the second temperature T2, freezing of the refrigerant 21 nevertheless being avoided. If, as a consequence, the temperature lies between the first and the second temperature T1, T2, the refrigeration system 4 is operated in a mixing state, the ratio of the second component 66 to the first component 64 lying between the two borderline cases which are shown in FIGS. 5 and 6.

The invention is not restricted to the above-described exemplary embodiments. Rather, other variants of the invention can also be derived herefrom by a person skilled in the art, without departing from the subject matter of the invention. Furthermore, in particular, all individual features which are described in conjunction with the different exemplary embodiments can also be combined with one another in a different way, without departing from the subject matter of the invention.

LIST OF REFERENCE CHARACTERS

2 Motor vehicle
4 Refrigeration system
6 Interior space
8 Wheel
10 Wheel hub motor
12 Power line
14 Energy store
16 Assembly
18 Condenser
20 Filler neck
21 Refrigerant
22 Outlet of the condenser
24 First line
25 Injection nozzle
26 Evaporator
28 Second metering apparatus
30 Outlet of the evaporator
32 Fifth line
34 Inlet of the condenser
36 Compressor
38 Separating location
40 Second line
42 Storage vessel
44 Third metering apparatus
46 Third line
48 First metering apparatus
50 Overflow
52 Fourth line
54 Filling level
56 Filler neck
58 Temperature sensor
60 Signal line
62 Heat accumulator
64 First component
66 Second component
68 Method
70 First operating step
72 Parameter
74 Second operating step
T1 First temperature
T2 Second temperature The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An assembly of a refrigeration system of a motor vehicle, wherein the refrigeration system has a refrigerant with a first component and a second component, comprising:
   a condenser; and
   an evaporator, wherein the evaporator is connected downstream fluidically of the condenser by a first line and has an outlet and a separating location which is coupled fluidically by a second line to a storage vessel for the second component of the refrigerant, wherein the outlet is disposed on a first side of the evaporator and the separating location is disposed on a second side of the evaporator and wherein refrigerant which is not evaporated during operation of the refrigeration system collects in the separating location.

2. The assembly as claimed in claim 1, wherein the storage vessel is coupled fluidically to the condenser by a third line which has a first metering apparatus and wherein the first metering apparatus is actuated dependent on a value of an external parameter.

3. The assembly as claimed in claim 2, wherein the storage vessel has an overflow which is coupled fluidically by a fourth line to the condenser.

4. The assembly as claimed in claim 2, wherein the first line has a second metering apparatus and/or the second line has a third metering apparatus.

5. The assembly as claimed in claim 2, wherein the outlet of the evaporator is connected fluidically by a fifth line to an inlet of the condenser and wherein the fifth line has a compressor.

6. The assembly as claimed in claim 1, wherein the storage vessel has an overflow which is coupled fluidically by a fourth line to the condenser.

7. The assembly as claimed in claim 6, wherein the first line has a second metering apparatus and/or the second line has a third metering apparatus.

8. The assembly as claimed in claim 6, wherein the outlet of the evaporator is connected fluidically by a fifth line to an inlet of the condenser and wherein the fifth line has a compressor.

9. The assembly as claimed in claim 1, wherein the first line has a second metering apparatus and/or the second line has a third metering apparatus.

10. The assembly as claimed in claim 9, wherein the outlet of the evaporator is connected fluidically by a fifth line to an inlet of the condenser and wherein the fifth line has a compressor.

11. The assembly as claimed in claim 1, wherein the outlet of the evaporator is connected fluidically by a fifth line to an inlet of the condenser and wherein the fifth line has a compressor.

12. The assembly as claimed in claim 11, wherein the fifth line has a heat accumulator.

* * * * *